May 7, 1940.    G. A. LYON    2,199,890
WHEEL COVER
Filed Feb. 20, 1939    2 Sheets-Sheet 1
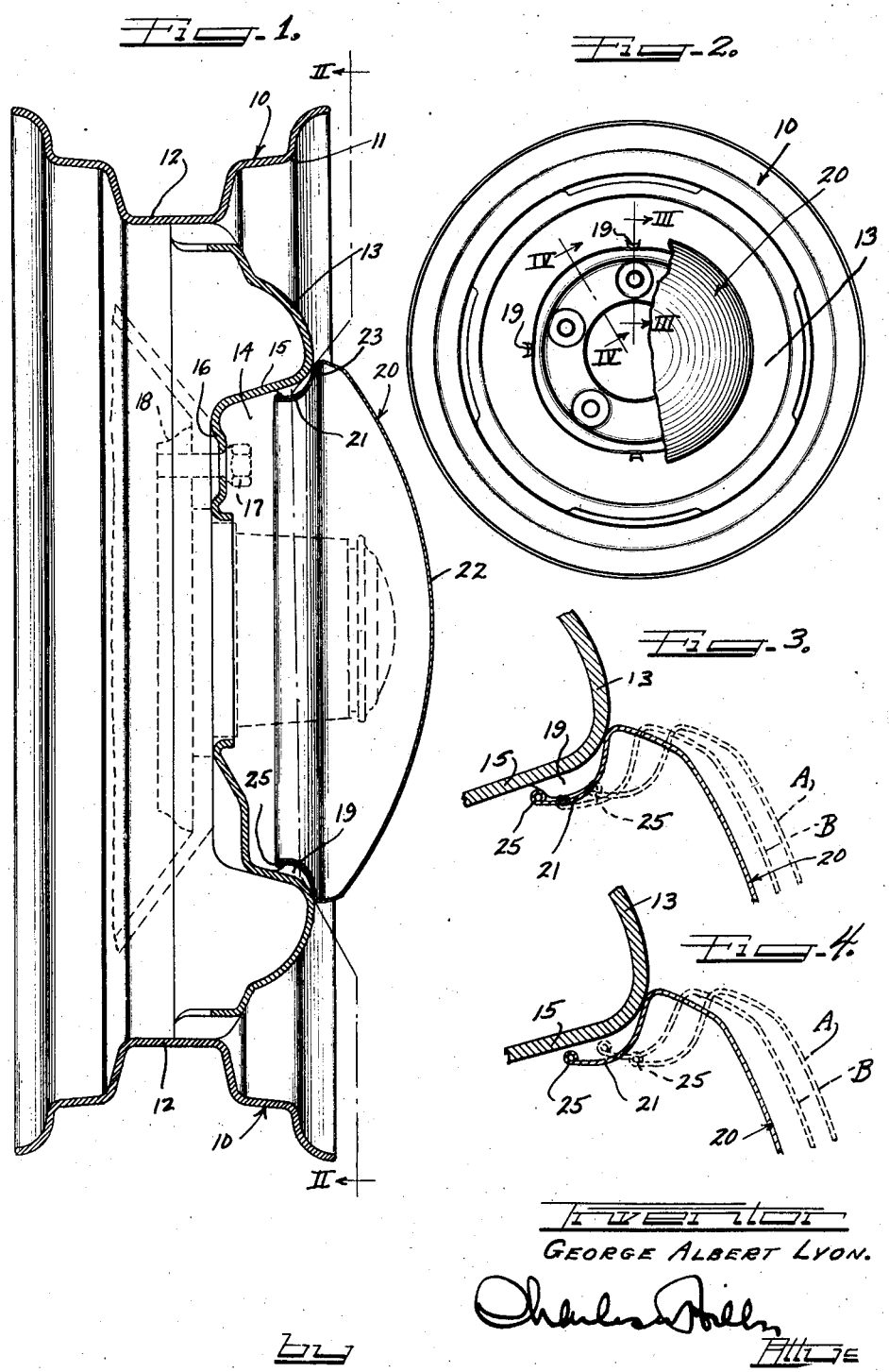
Inventor
GEORGE ALBERT LYON.

May 7, 1940.　　　G. A. LYON　　　2,199,890
WHEEL COVER
Filed Feb. 20, 1939　　2 Sheets-Sheet 2
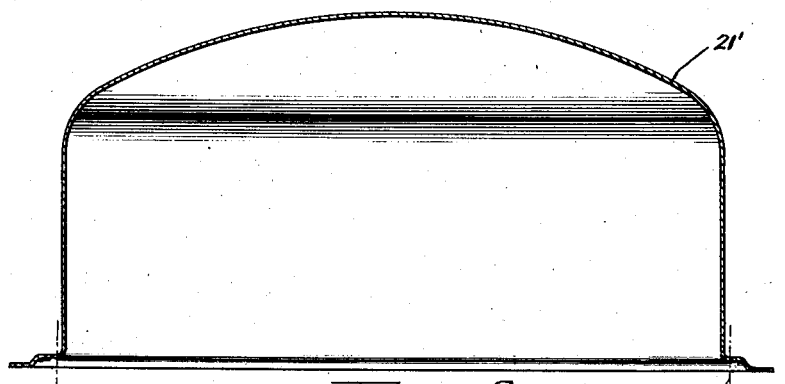
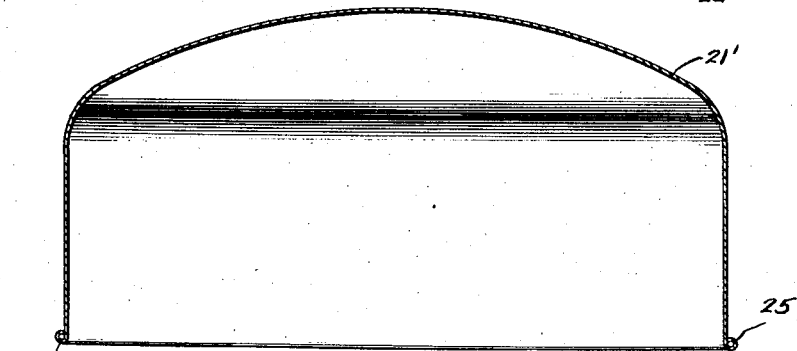
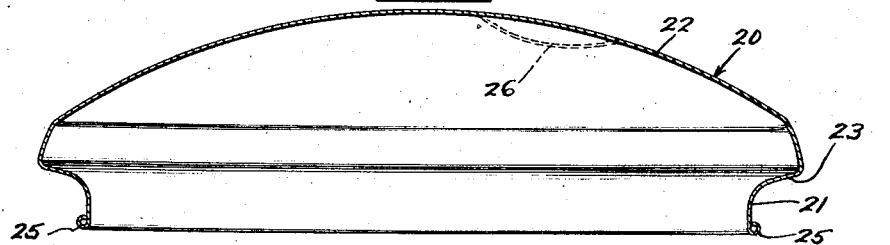
George Albert Lyon.

Patented May 7, 1940

2,199,890

UNITED STATES PATENT OFFICE 2,199,890

WHEEL COVER

George Albert Lyon, Allenhurst, N. J.

Application February 20, 1939, Serial No. 257,425

10 Claims. (Cl. 301—108)

This invention relates to an automobile wheel construction and, more particularly, to a snap-on wheel cover member and a method of making the same.

An object of this invention is to provide an improved and simplified construction for retaining a cover member or hub cap on an automobile wheel.

Another object of this invention is to provide a wheel hub cap of about less than one-half the weight of that usual cap so that the unsprung weight on an automobile may be materially reduced.

Another object of this invention relates to the provision of a wheel cover member or hub cap which may be retained on the body of the wheel by reason of the inherent resiliency or tension of the cover member.

A still further object of the invention is to provide an automobile wheel cover member or hub cap which, in reality, constitutes a spring diaphragm of such resilience and hardness as to resist impact blows and to enable slight indentations to be sprung outwardly without rupturing the metal of the cap. Another and further object of the invention is to so form a wheel cover member from stainless steel sheet that the metal is hardened and stretched in the drawing operation so as to impart to the cover member springiness approximating that of spring steel.

A still further object of the invention relates to the provision of a wheel construction wherein the body or spider part of the wheel has means of such character as to co-act with and cause a rear edge of a cover member to be deflected into a sprung or tensioned condition when the cover member is pressed axially onto the wheel, thereby retaining the cover member under tension on the wheel.

Yet another feature of the invention relates to the provision of an improved method of making a wheel cover member or hub cap so that the step of drawing the cover member from a sheet or blank of stock simultaneously results in the stretching and hardening of the metal in the cover member, particularly at points or places where resiliency is highly desirable and necessary.

In accordance with the general features of the invention there is provided a wheel construction including a wheel having a conventional tire rim to which is connected a body or spider part, and a metallic cover part for cooperation with the body part, and comprising a curved, central, dome portion, a turned-under outer margin adapted to seat on said body part, and a continuous circular skirt radially inward thereof and terminating in a flexible edge; the cover part, in reality, constituting a spring in which the dome portion is a resilient diaphragm to resist impact blows and to enable indentations therein to be sprung outwardly without rupturing the metal. Moreover, the body and cover parts have between them in the central bolt access opening of the wheel body part a plurality of spaced radial projections for springing said edge out of its normal circular shape, thus frictionally binding the two parts together when the cover part is snapped axially into engagement with the body part.

Another feature of the invention relates to the curling or turning of the flexible edge of the skirt so as to enhance its tension when it is sprung into retaining cooperation with the wheel body part.

In accordance with other features of the invention, I have provided a wheel cover member and method of making the same wherein during the process of cold drawing the cover member from a sheet of stainless steel the material is cold worked to such an extent under controlled conditions as to result in the formation of a dome-shaped article with resilient characteristics approximating that of spring steel, such spring characteristics being emphasized at two particular portions of the article—namely, in the dome itself, which is, by reason thereof, in reality a spring diaphragm; and in a concealed inner skirt portion, which is, by reason of the direction in which it extends, increasingly tensioned toward the free edge of the skirt.

Other objects and features of this invention will more fully appear from the following description, taken in connection with the accompanying drawings which illustrate a single embodiment thereof and in which:

Figure 1 is a vertical, cross-sectional view taken through a wheel construction embodying my invention and showing in dotted lines a suitable or conventional central support to which the wheel is secured;

Figure 2 is a front view, on a reduced scale, taken on a line II—II of Figure 1, looking in the direction indicated by the arrows and broken away to show the co-action between the skirt on the cover member and the projections on the wheel body member;

Figure 3 is an enlarged fragmentary sectional view taken on substantially the line III—III of Figure 2, looking in the direction indicated by the arrows and showing in dotted lines the different positions of the flexible skirt of the cover member as it is moved into co-action with one of the projections on the wheel body member;

Figure 4 is an enlarged, fragmentary sectional view taken on substantially the line IV—IV in Figure 2, looking in the direction indicated by the arrows and showing in dotted lines a plurality of different positions of the flexible skirt of the cover member as it is moved into telescoping cooperation with the wheel body part, the view being taken at a point between projections on the body part;

Figure 5 is an end view of a stainless steel, flat blank from which the cover member is cold drawn;

Figure 6 is a sectional view illustrating the first step of my process and showing the dome-shaped article that is cold drawn from the blank illustrated in Figure 5, the dotted lines indicating how the edge of this article is trimmed subsequent to the drawing operation;

Figure 7 is a very similar view to Figure 6, but showing the edge of the article curled or turned into a small bead; and Figure 8 illustrates the article or cover member after the stamping shown in Figure 7 has been collapsed, in a suitable collapsing die to give the article the desired hub cap shape.

As shown on the drawings:

The reference character 10 designates generally a conventional drop center tire rim, including the usual side flanges 11 and a base flange 12, to which is riveted, welded, or otherwise secured a spider or body member 13 which has a central depression or bolt access opening 14, defined by a lateral wall 15 terminating in a bolt flange 16. This bolt flange 16 is adapted to be secured in the usual way, such as by cap screws or bolts 14, to a suitable circular support 18, illustrated in dotted lines.

As is well known to those skilled in the automobile wheel art, it is common practice to provide a detachable closure member for concealing these bolts. A closure or cap member embodying the features of this invention is shown in Figures 1 and 2 and is designated generally by the reference character 20. The closure member, as I shall describe more in detail hereinafter, is adapted to have a snap-on co-action with a plurality of lateral projections or bumps 19 connected to the wall 15 of the wheel body part 13. These projections may, if it is so desired, be attached to this body part, although the preferable way of providing them is to depress spaced portions of the body part at the time that the body or spider part is being fabricated.

Each of these projections 19 is of relatively narrow width, as shown in Figure 2, and of a predetermined depth for co-action with a flexible skirt 21 on the hub cap or cover member 22, as best shown in Figure 3. While any suitable number of projections may be used, I have found that satisfactory results may be obtained by using four equi-distantly spaced projections, as shown in Figure 2.

The hub cap 20 is made from a single sheet or piece of metal and, in addition to the skirt 21, includes a dome portion 22 connected to the skirt 21 by a turned-under margin 23, which defines a shoulder adapted to seat on the outer face of the wheel body member 13, as shown in Figure 1. Also, the innermost extremity of the flexible skirt 21 is curled into a small wire-like bead 25 for enhancing the tension of the rear edge of the cap, particularly when this edge is sprung into hub cap retaining co-action with the spaced projections 19.

The dome portion 22 is resilient to the extent that it is like a spring in that it is capable of resisting impact blows and, moreover, will enable slight indentations therein to be snapped or pressed outwardly by manual pressure on the inner side of the indentation.

In Figure 8 I have illustrated a complete hub cap. I have shown in dotted lines at 26 an indentation such as can be manually pressed or snapped outwardly to the normal contour of the dome portion.

The skirt 21, by reason of its extending in a generally axial direction has its greatest flexibility at its inner edge 25. Moreover, when this skirt is in a sprung condition on the wheel, it does not materially affect the remaining portions of the hub cap by reason of the fact that it emanates from a shoulder 23 on the cap which is held and seated tightly against an outer face of the wall of body part 13.

The shoulder 23 is between the flexible dome and flexible skirt and, by reason of it being located at the turned and channeled section of the margin of the cap is relatively rigid so that it can withstand without distortion or buckling the pressure of a pry off tool inserted between the edge of this shoulder and the adjoining wheel body.

In the application of the hub cap to the wheel, it is first brought to a position such as that indicated by dotted lines at A in Figures 3 and 4. It is then moved into the intermediate position shown by the dotted lines B and, lastly, into its retained position shown by the full lines in Figures 3 and 4.

During the course of this movement the edge 25 is sprung or snapped over the projections 19 as the skirt 21 is pressed into telescoping cooperation with the central wall portion 15 of the wheel body part 13. That is to say, the continuous, flexible edge 25 is distorted from its normal circular shape to a shape such as that illustrated in Figure 2. In this latter condition the lateral edge 25 embracing the projections 19 are flexed inwardly, whereas other and alternate portions of the edge between the projections are flexed outwardly, thereby tightly and flexibly binding the edge under tension to the body part so as to detachably retain the hub cap on the wheel. This co-action is of such magnitude that it requires the use of a pry-off tool such as a screw driver, as well as considerable pressure, to remove the cap from the wheel; this removal being effected by inserting the edge of the screw driver between the relatively rigid lateral shoulder 23 of the cap and the wheel body member 13, and prying the cap outwardly.

In Figure 3 I have illustrated the different positions of a portion of the skirt as it is being moved into contact with one of the projections 19. In Figure 4 I have illustrated different positions of a portion of the skirt not in contact with a projection but disposed between adjoining projections.

As shown in Figure 3, a portion of the skirt contacting a projection is sprung laterally inward from the normal circle of the edge 25 when in retaining cooperation with the projection. On the other hand, as shown in Figure 4, a portion of the skirt not in contact with a projection 19 is caused to spring slightly outward, in a radial direction, when the cap is in its retained position.

Now in order to provide the hub cap of my invention with the requisite resiliency and tension to enable it to act in the aforesaid manner, I have devised a process of making the cap which enables the desired characteristics to be imparted to the article without necessitating the use of so-called spring steel. Needless to say, in the fabrication of a hub cap, there are two important factors to be considered—one is appearance, and the other is cost. I have found that by making the hub cap of what is commonly referred to in the industry as stainless steel—namely, a chrome nickel steel alloy—I am enabled to do without the necessity of having to plate the resulting hub cap. The desired lustre and finish may be obtained on this stainless steel article by simple buffing and polishing operations.

I have attained good results by using stainless steel having from 16 to 18% chromium and from 6 to 8% nickel. So far, however, I have attained excellent results with a stainless steel known as 17—7 Steel which has, roughly, the following percentages of alloys:

|  | Per cent |
|---|---|
| Chromium | 17 |
| Nickel | 7 |
| Carbon | .12 to .20 |
| Manganese | .06 to 1¼ |

It is, of course, well known to stainless steel metallurgists that by adding manganese it is possible to cause this unstable alloy to approach a stable point.

In using this particular alloy steel, as far as I have been able to determine from those familiar with the characteristics of this steel, I have, during the drawing of my hub cap, caused what metallurgists refer to as a precipitation of the constituents along the slip binds of crystals. In the course of this metallurgical phenomenon, the material of my novel hub cap being cold drawn, is caused to flow to the required extent as well as to harden and yet not result in a rupture of the metal. The ensuing product is very tough from the standpoint that it is difficult to rupture the metal by repeatedly striking the cap, and any indentations made in the cap may be removed by merely snapping or springing the indentations in much the same manner as one can snap or flex a thin piece of spring steel.

In Figure 5 I have illustrated roughly a blank of stainless steel from which my novel hub cap is cold drawn. In Figure 6 I have illustrated the result of the first draw in which it will be perceived that the drawn part is cup-shaped and has a bulged or dome-shaped outer surface. Also, during this drawing operation, the edge of the blank is given a preliminary bend in the direction that it is desired to curl the edge to form the turned edge of the cap.

I have designated the dome-shaped part in Figure 6 by the reference character 21'. The numeral 25' indicates the part of the edge of this stamping which has already been given a slight turn for later use in the curling of it into a turned edge. The dotted lines in Figure 6 illustrates the line on which the edge is trimmed so that the surplus hold-down track used in making the draw may be cut from the stamping.

After this trimming operation, the portion 25' is suitably curled in a die to form the turned edge 25 shown in Figure 7. Thereafter, the stamping of Figure 7 is placed in any suitable collapsing die and the vertical wall of the stamping is collapsed to form the stamping into the final product or hub cap 20 shown in Figure 8.

During this process of cold drawing and working the hub cap from a sheet of stainless steel, I have noted that the material is considerably hardened. For example, in the case of 17—7 stainless steel stock of .022 gauge, having an initial Rockwell hardness of approximately 74 (B scale) I have noted the following results.

The central or dome portion has a Rockwell of 100 and has a decreased thickness amounting to .021. The extreme outer margin of the hub cap has a thickness of approximately .020 and a Rockwell of 104. The skirt has substantially the same thickness but has a Rockwell of 105, whereas, the turned edge has a Rockwell hardness considerably in excess of 105.

While it is, of course, appreciated that the flow of the metal can be controlled by the nature of the die parts used, as well as the drawing operation employed, the result of the tests I have made conclusively establish that the cold working and drawing of my novel hub cap results in such hardening of the steel that the ensuing product has spring characteristics approximating—and in some cases even greater than—that of spring steel. It is, of course, well known that spring steel may have a Rockwell hardness of 100 or more, depending upon the constituents of the steel.

Thus, I have formed my hub cap from material which normally does not have the springiness or hardness of spring steel, but which, during the course of the cold rolling and drawing operations, is so altered that the ensuing product does have these characteristics of spring steel.

These characteristics are particularly advantageous in my product since they enable the dome portion 21 to resist impacts tending to dent or mar the same. Also, by reason of the fact that the material includes nickel, it is very ductile and it is difficult to crack or rupture the metal, even though the dome portion is subjected to a great amount of abuse in excess of even that which the hub cap would be subjected to in use on an automobile.

In addition to the foregoing, the hardness imparted to the steel alloy causes the flexible skirt and its edge to be highly tensioned when sprung into retained engagement with the wheel body part. This tension is so great that it takes a considerable force to pry loose the hub cap from its co-action with the wheel. As far as I know, I am the first to utilize the cold working or drawing of the article to impart these desirable and essential characteristics to the ensuing hub cap. As a consequence of these features being present in the cap, I am enabled to use a single thickness of material without any backing such as has been used in caps heretofore, and I am also enabled to dispense with any separate spring-attaching devices or fingers, such as have been used heretofore.

I claim as my invention:

1. As an article of manufacture, an automobile wheel hub cap formed from a single metallic blank and comprising a central dome portion, and a turned under outer margin at the outer periphery of said dome portion and comprising a channeled section providing at the outer periphery of said cap a sufficiently rigid portion to withstand the pressure of a pry off tool, said turned under outer margin comprising an inturned flange which has a substantially radially inwardly extending resilient part and a rearwardly extending resilient part terminating in a curled circular edge adapted for snap-on pressure applying and retaining engagement with the part of the wheel, said cap being of such springiness that the dome portion is resilient to resist impact blows and to enable indentations therein to be sprung outwardly without rupturing the metal and said flange is increasingly flexible toward its edge so that said edge may be sprung out of its normal circular shape when the cap is pressed into retained position on the wheel.

2. As an article of manufacture, an automobile wheel hub cap formed from a single metallic blank and comprising a central dome portion, and a turned under outer margin and for providing the periphery of the dome portion with rigidity and comprising an inturned flange which has a substantially radially inwardly extending resilient part and a rearwardly extending resilient part terminating in a flexible circular edge adapted for snap-on pressure applying and retaining engagement with a part of the wheel, said cap comprising a spring construction in which the dome portion is resilient to resist impact blows and to enable indentations therein to be sprung outwardly without rupturing the metal and in which said flange is increasingly flexible toward said edge so that said edge may be sprung out of its normal circular shape when the cap is pressed into retained position on the wheel, said turned under margin defining a shoulder at the back side of the cap adapted to be seated on a surface of the wheel and being relatively rigid for engagement by a pry off tool.

3. As an article of manufacture, an ornamental cover member adapted to be disposed in retained engagement with the outer side of an automobile wheel, comprising a circular dome, said dome being cold drawn from a single piece of relatively thin metallic sheet and in which dome the material is hardened and stretched and has resiliency approximating that of spring steel, said dome comprising a single thickness of material transversely flexible to resist impact blows and to enable indentations therein to be sprung outwardly without rupturing the metal.

4. In a wheel construction, a wheel including a rim and a body part provided with a central bolt access opening and a metallic cover part for disposition over said opening comprising a central dome portion, a turned under outer margin adapted to seat on said body part and a continuous circular skirt radially inward of said outer margin and terminating in a flexible continuous edge, said cover part constituting a spring structure in which the dome portion is a resilient diaphragm to resist impact blows and to enable indentations therein to be sprung outwardly without rupturing the metal and in which said skirt is increasingly flexible toward its edge, said body and cover parts having between them in said central opening a plurality of spaced radial projections for springing said edge out of its normal circular shape thus frictionally binding said cover part to said body part when said cover part is snapped axially into engagement with said body part.

5. In a wheel construction, a wheel including a rim and a body part provided with a central bolt access opening and a metallic cover part for disposition over said opening comprising a central dome portion, a turned under outer margin adapted to seat on said body part and a continuous circular skirt radially inward of said outer margin and terminating in a concealed continuous flexible edge, said dome portion being a resilient diaphragm to resist impact blows and to enable indentations therein to be sprung outwardly without rupturing the metal and said skirt being increasingly flexible toward its edge, said body and cover parts having between them in said central opening a plurality of spaced radial projections for springing said edge out of its normal circular shape thus frictionally binding said cover part to said body part when said cover part is snapped axially into engagement with said body part, portions of said edge being sprung radially outward between said projections thereby causing said cover part to be detachably retained under tension on said body part.

6. A closure cap for motor vehicle wheels made of thin metallic material and formed with a springy outer face portion comprising a resilient diaphragm for yieldably resisting permanent indentation and a circular pry-off outer peripheral part made relatively rigid by an inturned flange, said flange having a substantially radially inwardly extending resilient part and a rearwardly extending resilient part terminating in a tightly curled continuous reinforced resilient circular edge adapted for snap-on pressure-applying holding engagement with a plurality of under-extending rigid protuberances located adjacent the outer face of the wheel.

7. A closure cap for motor vehicle wheels made of thin metallic material and formed with a springy outer face portion comprising a resilient diaphragm for yieldably resisting permanent indentation and a circular pry-off outer peripheral part made relatively rigid by an inturned flange and an integral rearwardly extending resilient portion formed with a folded continuous resilient reinforced edge adapted for snap-on pressure-applying holding engagement with a plurality of under-extending rigid protuberances located adjacent the outer face of the wheel.

8. As an article of manufacture, an ornamental cover member adapted to be disposed in retained engagement with the outer side of an automobile wheel, comprising a circular dome, said dome being cold drawn from a single piece of relatively thin metallic sheet and in which dome the material is hardened and stretched and has resiliency approximating that of spring steel, said dome comprising a single thickness of material transversely flexible to resist impact blows and to enable indentations therein to be sprung outwardly without rupturing the metal, said cover member also being provided with a flange extending rearwardly and inwardly and terminating in a continuous circular flexible reinforcing bead for cooperation with protuberance means on the wheel.

9. As an article of manufacture, an ornamental cover member adapted to be disposed in retained engagement with the outer side of an automobile wheel, comprising an outer face portion made of relatively thin metallic sheet formed so that said face portion is transversely resilient to resist impact blows and to enable slight indentations therein to be readily sprung outwardly without rupturing the metal, and an inturned continuous circular flexible flange for snap-on detachable cover member retaining engagement with a portion of the wheel.

10. A cover member as defined in claim 9 and wherein the cover member substantially in its entirety constitutes a springy structure in which substantially all portions thereof coact in the springing of said flange into retained engagement with the wheel and wherein the face portion is provided with a pry-off peripheral part adapted to be engaged by a pry-off tool to forcibly eject the cover member from the wheel.

GEORGE ALBERT LYON.